UNITED STATES PATENT OFFICE.

EARL P. STEVENSON, OF CAMBRIDGE, MASSACHUSETTS, ASSIGNOR, BY MESNE ASSIGNMENTS, TO GENERAL BOND AND SHARE COMPANY, OF BOSTON, MASSACHUSETTS, A CORPORATION OF DELAWARE.

PROCESS OF EXTRACTING POTASH FROM SALINE DEPOSITS AND BRINES.

1,415,204.  Specification of Letters Patent.  Patented May 9, 1922.

No Drawing.  Application filed August 7, 1919. Serial No. 315,876.

*To all whom it may concern:*

Be it known that I, EARL P. STEVENSON, a citizen of the United States, residing at Cambridge, in the county of Middlesex and State of Massachusetts, have invented certain Improvements in a Process of Extracting Potash from Saline Deposits and Brines, of which the following description is a specification.

This invention relates to the recovery of potash from the saline deposits and brines of certain lakes in the western part of this country and it is particularly concerned with the recovery of potash from Searles Lake, California. This lake consists essentially of a deep salt deposit covering a very large area and permeated with brine up to a point within a few inches of the surface. Various attempts have been made heretofore to recover potash from this brine or from the salt deposits of this lake, but none of these attempts, so far as I have been able to learn, have been successful in producing potash in a manner sufficiently economical to be practicable under ordinary market conditions.

It is the chief object of the present invention to devise a practical process suitable for practice on a commercial scale for economically extracting potash from this and similar brines. It is also an object of the invention to devise an efficient and economical method of eliminating carbonates from such brines regardless of the constituent which it is desired to extract from the brine. The brine treated may consist either of the natural brine or it may be a brine made by dissolving the saline deposits of one of these salt beds or lakes.

Searles Lake brine is essentially a solution containing the elements of sodium chloride, sodium sulphate, sodium carbonate, potassium chloride and borax. There are also present in traces other chemical elements which, however, need not be considered here. Of these chief ingredients the potassium chloride or muriate of potash is the most important commercially and is the material with which the present invention is concerned. Accordingly, the other salts, some of which, however, possess commercial value, may, so far as the present application is concerned, be regarded as waste salts. The problem present, therefore, is to separate the potassium chloride from the remaining salts and from the water in which all of these salts are held in solution by a process sufficiently economical to make it practicable. Furthermore, since one of the most important commercial uses of potassium chloride is as a fertilizer, it is very desirable that this material be extracted or recovered in a relatively pure condition; and it is particularly desirable that it shall not contain any great percentage of either borax or sodium carbonate. That is, borax in excess of 1½% is, by some authorities, considered injurious to plant life, while any substantial percentage of sodium carbonate may be objectionable in some fertilizers.

Considering the possible mixtures of salts present in the brine, the simplest mixture from which the potassium chloride can be extracted is a mixture with sodium chloride. According to the present process, therefore, it is proposed first to treat the brine to substantially eliminate the waste salts other than sodium chloride and thus to leave in the brine essentially a mixture of potassium chloride and sodium chloride only. This mixture of salts is then treated to separate the potassium chloride.

For the purpose of disclosing the process somewhat more clearly than would otherwise be possible, it will be herein described in connection with the treatment of a specific sample of Searles Lake brine, although it will readily be appreciated that the composition of the brine may vary in different parts of the lake and under different conditions. The sample to be considered analyzes substantially as follows:

|  | Per cent. |
|---|---|
| Sodium chloride, NaCl | 17.75 |
| Sodium sulphate, $Na_2SO_4$ | 4.46 |
| Sodium carbonate, $Na_2CO_3$ | 4.97 |
| Borax, $Na_2B_4O_7$ | 1.42 |
| Potassium chloride, KCL | 4.65 |

For the purpose of eliminating the waste salts the brine is first chilled sufficiently to precipitate the greater part of the sulphate, carbonate, and borate. The percentages of these substances that will be eliminated in this manner will vary with the degree to which the temperature of the brine is reduced, but this point will be determined not only by the elimination of waste salts but also, to some extent, by considerations of economy and the conditions under which the process is practised. Under most circumstances the most satisfactory temperature appears to be between −15° C. and −20° C. I find that after the sample of brine above referred to has been chilled to −15° C. and the precipitate filtered off, the remaining brine has a composition substantially as follows:

|         | Per cent. |
|---------|-----------|
| $Na_2SO_4$ | .61 |
| $Na_2B_4O_7$ | .81 |
| $Na_2CO_3$ | 1.55 |
| NaCl    | 18.15 |
| KCL     | 6.57 |

The potassium chloride does not separate as a solid at this temperature, nor even at a considerably lower temperature, although a very small percentage is lost due to occlusion by the precipitated salts. This chilling or refrigerating step also has the advantage of eliminating about 20% of the water as water of crystallization and thus reduces very substantially the quantity of liquid that must be handled in performing the subsequent steps of this process.

In order to effect a further elimination of the waste salts left in the brine after the chilling operation, the brine is next treated with a suitable precipitant for these substances, preferably calcium sulphate. Considerations of availability and expense make it usually advisable to use calcium sulphate in the form of gypsum. Towers may be packed with gypsum and the brine run through them. This treatment eliminates all the sodium carbonate. The brine is filtered to remove any solid matter and the filtrate is next evaporated to dryness, preferably by solar evaporation, thus producing a low grade potassium salt for which there is a limited market. By evaporating the brine to dryness, which can readily be accomplished by natural or solar evaporation, the difficult and expensive operations involved in the separation of the salts by a high temperature evaporation are eliminated from my process It is obvious that the brine may be treated with gypsum before the chilling operation has been performed instead of afterwards, as just described, and the treatment before chilling has the advantage that a more efficient separation of the borax takes place during the chilling operation. On the other hand, the quantity of gypsum required to treat the brine before it is chilled is so much greater than that required after chilling that I consider it preferable, under most circumstances, to use the gypsum treatment after the chilling operation has been completed.

For most purposes a higher grade of potash than that produced simply by following the steps above described is required. It will be seen that this dry mixture of salts consists chiefly of potassium chloride and sodium chloride with very small percentages of sodium sulphate and borax. In order to separate the potassium chloride from the other salts I prefer to extract this mixture of salts with a liquor saturated with sodium chloride and calcium sulphate. This may be done in a suitable apparatus by running the extraction liquor, preferably heated to a temperature of about 100° C., through the mixture of salts until all of the potassium chloride has been dissolved out and the liquor is substantially saturated with potassium chloride. This hot saturated liquor is drawn off through a filter which removes the undissolved salts and it is then cooled to ordinary temperatures when the potassium chloride separates out due to the fact that the solubility of potassium chloride in such a solution decreases with a decrease in temperature while the solubility of sodium chloride increases with a decrease in temperature. This potassium chloride crop is filtered off and the extraction liquor is used over and over again to extract successive crops of potassium chloride. It is obvious that as the extraction liquor is used in successive cycles it may become contaminated with substances other than those desired in the extraction process. These substances, however, do not ordinarily interfere with this process.

While the potassium chloride in separating from a concentrated solution of sodium chloride and sodium sulphate will occlude and adsorb some of the latter substances from the solution, still it is possible by this process to obtain a grade of muriate of potash which compares very favorably with the present commercial grades.

Under some circumstances it is desirable to modify the process above described by evaporating the brine to dryness by solar evaporation immediately after the precipitates have been filtered out following the refrigerating or chilling step and then to mix the residual salts with gypsum in any convenient machine, as, for instance, in a suitable grinder. This mixture is then extracted for its potassium chloride content with a solution saturated with sodium chloride and calcium sulphate. The undissolved salts are filtered out of the hot extraction liquor and the liquor is then cooled to crystallize out the potassium chloride, as above described. The calcium sulphate performs the same function here as in the process above described, namely, that of precipitating the sodium carbonate. While some potassium sulphate is formed due to the gypsum treatment, this salt is in no wise objectionable. A very small percentage of this potassium sulphate will crystallize out of the extraction liquor with the potassium chloride. In the process of extracting the potassium chloride from the dried mixture of salts obtained in either of the ways above described, the saturation of the extraction liquor with calcium sulphate is of particular advantage since its presence greatly retards the rate at which the borax will be dissolved in the extraction liquor. The potassium chloride is very soluble and consequently is quickly taken up by the extraction liquor and the fact that the borax is taken up only very slowly in an extraction liquor of the character here used, results in producing a much purer grade of potassium chloride than otherwise would be possible.

While this process has been herein described as applied to the recovery of potash from Searles Lake brine, it will be readily appreciated by those skilled in this art that the process is applicable to a great variety of brines, such as those found in many lakes in the western part of the country and those made by dissolving salts from salt beds and lakes. Consequently, it will be understood that the term "Searles Lake brine" as used in the appended claims identifies the type of brine to which the present invention is applicable rather than brine necessarily taken from Searles Lake. It will also be understood that some features of this process, especially that of removing the sodium carbonate from the brine, are applicable to processes for recovering constituents of value other than potash from the brines of the character herein referred to.

What is claimed as new is:

1. The process of extracting potash from Searles Lake brine which consists in chilling the brine to eliminate a substantial percentage of the waste salts contained therein, evaporating the remaining brine to dryness, mixing the dried salts so retained with a precipitant for waste constituents of the dried salts, and then extracting said mixture for its potash content.

2. The process of extracting potash from Searles Lake brine which consists in chilling the brine to eliminate a substantial percentage of the waste salts contained therein, evaporating the remaining brine to dryness and then treating the dried mixture of salts so obtained to remove the potassium chloride from the mixture and using calcium sulphate in said treatment to precipitate the sodium carbonate content of said mixture.

3. The process of extracting potash from Searles Lake brine which consists in chilling the brine to eliminate a substantial percentage of the waste salts contained therein, evaporating the remaining brine to dryness, mixing gypsum with the dried salts so obtained, treating the mixture thus produced with a hot solution substantially saturated with sodium chloride and calcium sulphate to dissolve the potassium chloride, and then cooling the hot solution to cause the potassium chloride to crystallize out.

4. The process of extracting potash from Searles Lake brine which consists in chilling the brine to remove a substantial percentage of the waste salts, treating the remaining brine with calcium sulphate to effect a further elimination of the waste salts from the brine, and evaporating the remaining brine to dryness.

5. The process of extracting potash from Searles Lake brine which consists in chilling the brine to remove a substantial percentage of the waste salts, filtering off the precipitate, treating the filtrate with calcium sulphate to effect a further elimination of the waste salts thus leaving the brine rich in potassium chloride and sodium chloride, evaporating the brine to dryness, and then treating the dried salts to separate the potassium chloride.

6. The process of extracting potash from Searles Lake brine which consists in chilling the brine to remove a substantial percentage of the waste salts, treating the remaining brine with calcium sulphate to effect a further elimination of the waste salts from the brine, evaporating the remaining brine to dryness, by solar evaporation and extracting the resulting mixture of salts for its potash content.

7. The process of extracting potash from Searles Lake brine which consists in chilling the brine to remove a substantial percentage of the waste salts, treating the remaining brine with calcium sulphate to effect a further elimination of the waste salts from the brine, evaporating the remaining brine to dryness, and extracting the resulting mixture of salts for its potash content with a saturated solution of calcium sulphate and sodium chloride.

8. The process of extracting potash from Searles Lake brine which consists in chilling the brine to remove a substantial percentage of the waste salts, filtering off the precipitate, treating the filtrate with calcium sulphate to effect a further elimination of the waste salts, evaporating the remaining brine to dryness, extracting the resulting mixture of salts with a hot saturated solution of calcium sulphate and sodium chloride, filtering off the undissolved salts and cooling the filtrate to precipitate the potassium chloride.

9. The process of extracting potash from Searles Lake brine which consists in chilling the brine to eliminate a substantial percentage of the waste salts contained therein, evaporating the remaining brine to dryness by solar evaporation, mixing calcium sulphate with the dried salts so obtained, treating the mixture thus produced with a hot extraction liquor from which the potassium salts will crystallize out substantially unaccompanied by other salts, and then cooling the hot solution to cause the potassium salts to crystallize out.

10. The process of extracting potash from Searles Lake brine which comprises the following steps, namely, chilling the brine to eliminate a substantial percentage of the waste salts contained therein, evaporating the remaining brine to dryness, extracting the resulting mixture of dried salts for its potash content, and at some stage of the process adding calcium sulphate to the material under treatment to substantially eliminate the carbonate constituents of the brine.

In testimony whereof I have signed my name to this specification.

EARL P. STEVENSON.